United States Patent
Burnham

[11] Patent Number: 6,038,716
[45] Date of Patent: *Mar. 21, 2000

[54] CONDENSATION TRAP FOR A SHOWER CUBICLE

[76] Inventor: Jeffrey Burnham, 6 Ajax Close, Laceby Acres, Grimsby DN34 5QR, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/716,494

[22] Filed: Sep. 18, 1996

[51] Int. Cl.[7] .................................................. A47K 3/22
[52] U.S. Cl. .................................................. 4/614; 55/462
[58] Field of Search .................... 4/524, 612, 614; 159/28.6; 55/394, 462

[56] References Cited

U.S. PATENT DOCUMENTS

| | | |
|---|---|---|
| 2,055,048 | 9/1936 | Puls ........................................ 55/462 X |
| 2,212,429 | 8/1940 | Yutzler ................................... 55/462 X |

FOREIGN PATENT DOCUMENTS

| | | |
|---|---|---|
| 269191 | 6/1988 | European Pat. Off. . |
| 498712 | 1/1939 | United Kingdom . |
| 723239 | 2/1955 | United Kingdom . |
| 2125155 | 2/1984 | United Kingdom . |
| 2287531 | 9/1995 | United Kingdom . |

*Primary Examiner*—Robert M. Fetsuga
*Attorney, Agent, or Firm*—Jackson Walker L.L.P.

[57] ABSTRACT

A condensation trap for a shower cubicle, comprises a generally convex cover for the cubicle, the cover having inner and outer walls spaced apart from each other, the inner wall having an opening in the uppermost part thereof and the outer wall having a plurality of openings adjacent to the lower edge of the trap in contact with the cubicle. Drainage holes are provided for discharging condensed water from between the walls into the shower cubicle. The trap reduces water vapor in the room in which the shower cubicle is installed, thereby reducing the effects of dampness caused by condensed water vapor on the surfaces of the room.

8 Claims, 3 Drawing Sheets

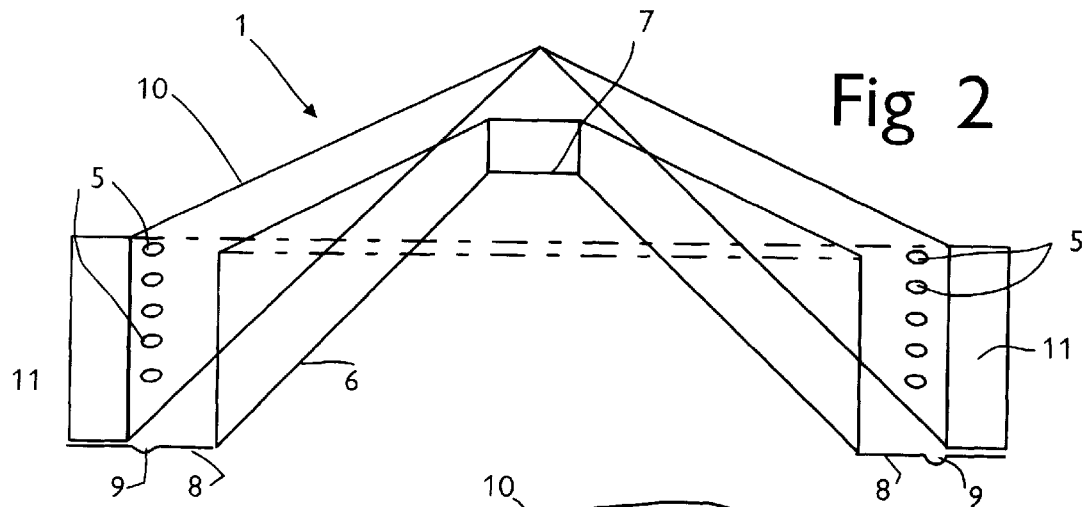
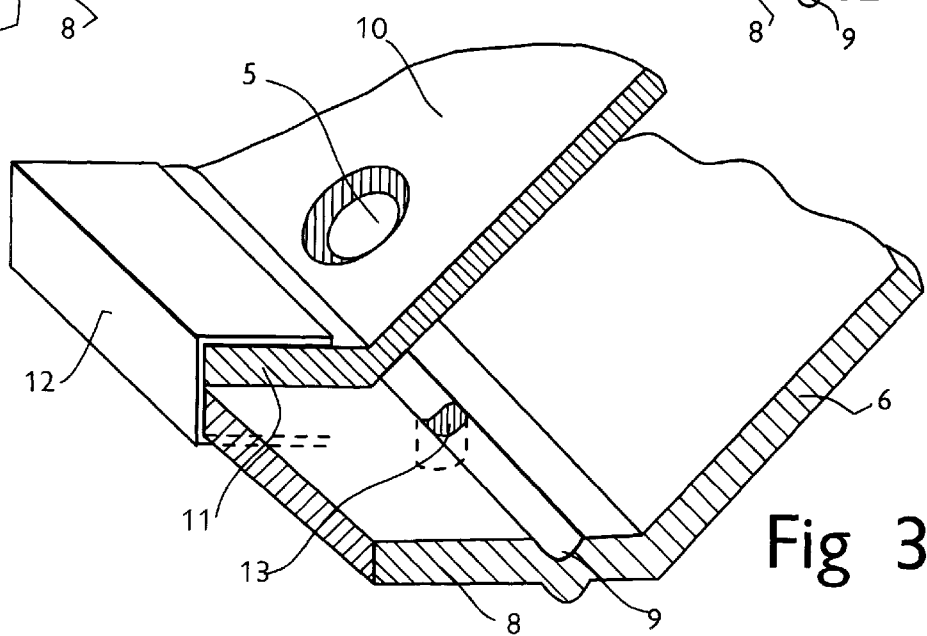
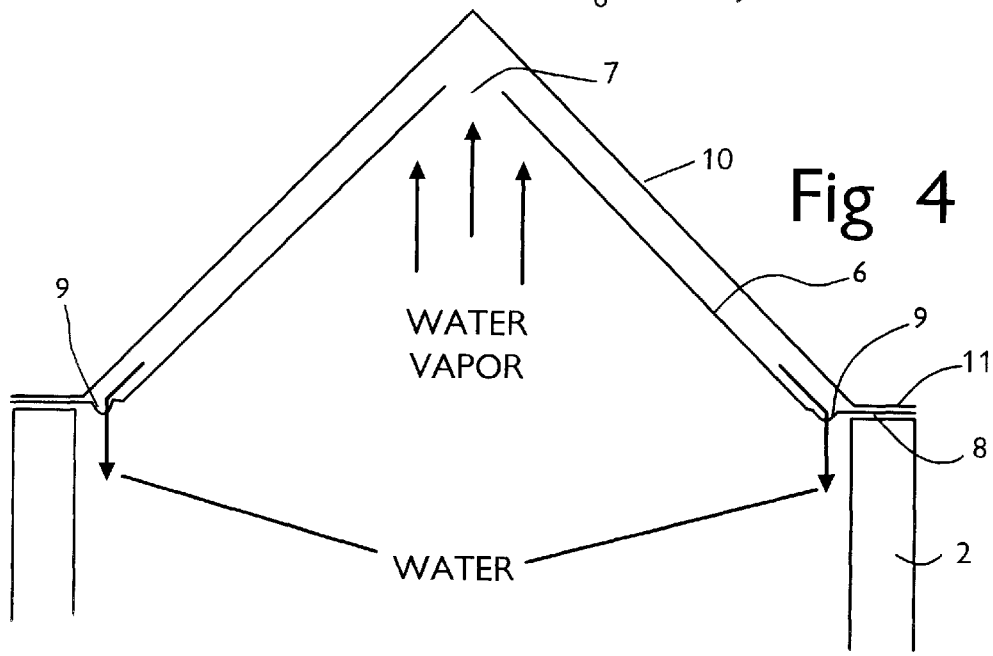

CONDENSATION TRAP FOR A SHOWER CUBICLE

FILED OF THE INVENTION

This invention relates to a condensation trap for use with a shower cubicle.

BACKGROUND OF THE INVENTION

Condensation in the domestic bathroom is a well known problem. A large amount of water vapor is generated by hot water showers. This water vapor will readily condense out on any surface colder than itself. The resultant condensation can lead to damp and mold in the bathroom area. The most common attempt to solve this problem is to install a ventilation fan, usually in an outside wall or window. Although ventilation fans are inexpensive to buy, installation costs can be high, and the fan does not necessarily cure the condensation problem, as not all of the water vapor will be extracted, and the remaining vapor will still tend to collect on bathroom surfaces, e.g. walls, floors and ceilings.

The condensation trap of the invention has significant advantages over existing ventilation systems, as it needs no specialist installation skills, and when fitted onto a shower cubicle prevents water vapor from condensing outside the cubicle.

SUMMARY OF THE INVENTION

According to the present invention there is provided a condensation trap for a shower cubicle, comprising a generally convex cover for the cubicle, the cover having inner and outer walls spaced apart from each other, the inner wall having an opening in the uppermost part thereof and the outer wall having a plurality of openings adjacent to the lower edge of the trap in contact with the cubicle, and drainage holes for discharging condensed water from between the walls into the shower cubicle.

The trap may be of any suitable convex shape, for example, a hemisphere, a pyramid or truncated pyramid, and suitably comprises four sides for use with a conventional four-sided shower cubicle, although it will be appreciated that other shapes can be used for cubicles of other configurations, for example with fewer or more sides. A series of holes may be arranged around and near its base.

In use, warm air containing a high level of water vapor rises within the shower cubicle and passes through the opening in the inner wall into the cavity between the walls, where it comes into contact with the cooler outer wall, causing the vapor to condense and the air to cool. As the air cools, it flows downwardly in the cavity, escaping through the holes in the outer wall to the surrounding atmosphere. This process tends to draw in further warm air from within the shower cubicle. The condensed water flows over the inner surfaces of the walls within the cavity, to be returned to the shower cubicle through drainage means in the lowermost parts of the trap.

The spacing between the walls is sufficient to permit a flow of air to be established, but small enough to ensure satisfactory contact of the water vapor with the cooler outer wall of the trap. In practise, a gap of about 25 mm (1 inch) has been found to be satisfactory.

The size of the opening in the inner wall is preferably chosen so that its area is substantially equal to the sum of the areas of the holes in the outer wall, so that there is no build-up of pressure within the trap cavity, but it is possible that in some circumstances a greater or smaller opening may be desirable.

The type of material used in the construction of the condensation trap is preferably of a high thermal conductivity, so that heat given out during condensation of the water vapor is readily conducted away. Conveniently, the trap is formed of a plastics material, for example a material which can be readily vacuum formed. The inner wall of the trap may be formed of a material which has a lower thermal conductivity than the outer wall to discourage the vapor from condensing on the inside of the shower cubicle and then dripping on the user of the shower. Suitable plastics materials for the formation of the trap are, for example, polycarbonates, polystyrene and acrylic resins.

The trap may be formed with a circumferential external lip on its lower edge to assist in locating the trap on the shower cubicle. There is then no need for any fixings to be used to hold the trap in place, thus rendering installation, and removal for cleaning, simple operations which can readily be performed by a single person, without any special skill being required.

The inner and outer walls of the trap may be cemented sealed or otherwise fixed together, but are preferably held together by a removable circumferential elongate clip molding to enable the walls to be separated from each other for cleaning purposes. Each wall is thus suitably formed with a circumferential flange, the clip serving to hold the flanges together. The clip may be formed as a springy plastics or metal channel whose width is just sufficient to accommodate the two flanges together, but whose side walls press against the flanges, in use.

The walls may be formed so as to provide a gully in the space between the walls, in use, the gully serving to collect the condensed water and to channel it to locations where it may be returned to the interior of the shower cubicle, and thence to the drain, without discomforting the user of the shower by dripping cold water on to him or her. Suitably, therefore, the gully is provided with drain holes at intervals along its length, opening into the shower cubicle in use adjacent to the walls thereof.

The trap may be formed to transparent material to maximise transmission of light into the cubicle, or of translucent material to diffuse the light. If desired, coloured plastics material may be used to change the color of the light inside the cubicle. Alternatively, the trap may be formed of substantially opaque plastics materials. Electric lighting means for providing illumination within the cubicle may be incorporated into the trap, especially where the trap does not transmit light from outside the shower cubicle. The electric lighting means may consist of low-voltage electric lights.

In addition to reducing the level of water vapor in the room in which the shower is located, the trap of the invention serves to reduce heat loss from the shower cubicle, rendering its use more comfortable in cooler environments.

BRIEF DESCRIPTION OF THE DRAWINGS

Embodiments of the invention will now be described by way of example with reference to the accompanying drawings in which:

FIG. 2 shows the outer surface ventilation holes of the trap of FIG. 1;

FIG. 3 shows the fixing between the inner and outer walls of the trap of FIG. 1;

FIG. 4 shows a cross section of the trap; and

DETAILED DESCRIPTION OF THE ILLUSTRATED EMBODIMENTS

Figure 1:
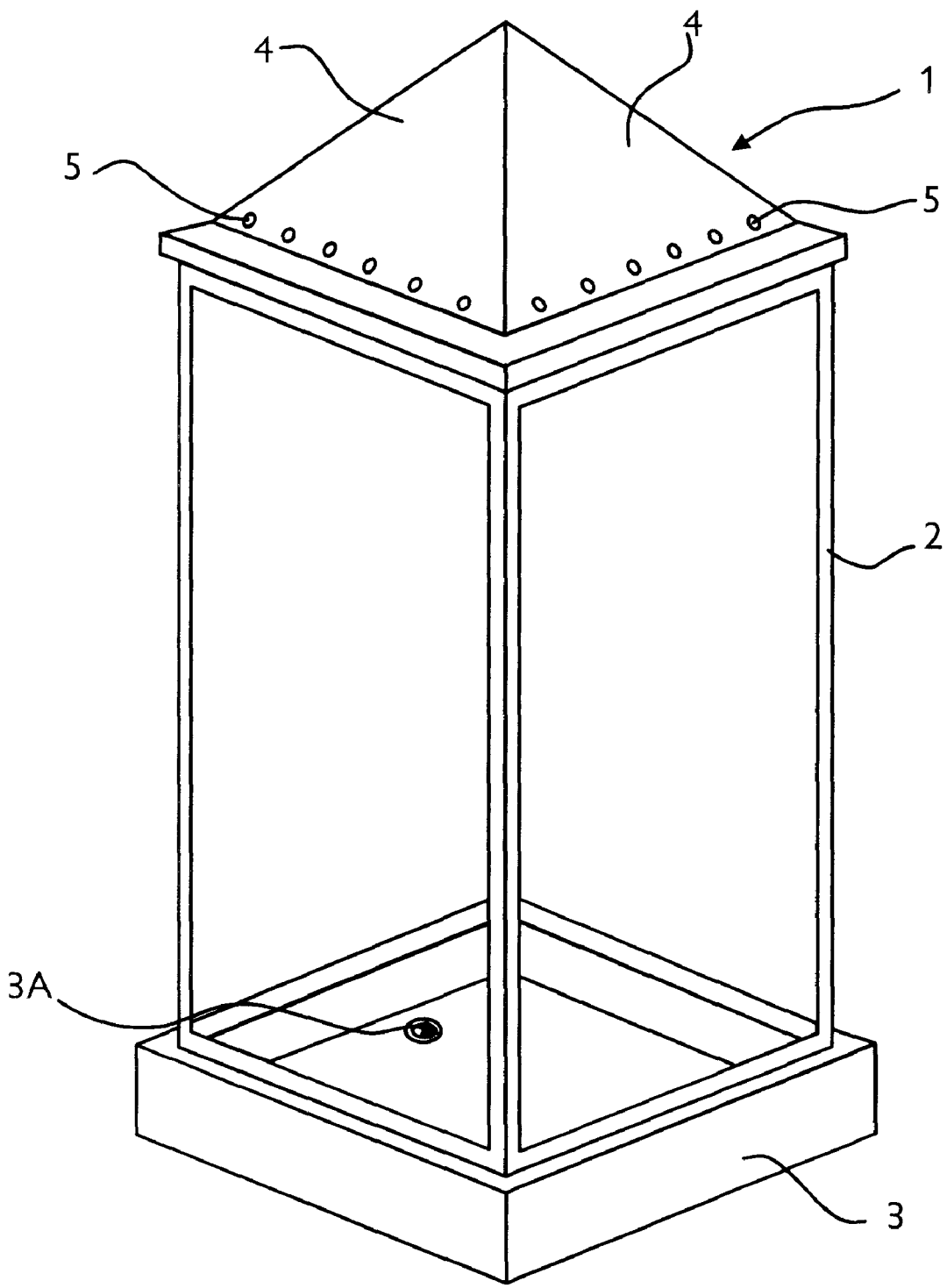
FIG. 1 shows in perspective a condensation trap in position on a shower cubicle.

Referring first to FIG. 1, the trap 1 of the invention is installed on a typical four-sided free-standing shower cubicle 2 located on a shower tray 3 having an interior main drain 3A. The trap comprises a generally convex cover in the form of a pyramid having four equal triangular sides 4, each of which is provided with a series of outlet holes 5 in the outer wall of the cover. As may be seen from FIG. 2, the trap consists of two separate plastics moldings, for example formed as vacuum moldings from sheets of transparent plastics material such as polystyrene. The inner wall or molding 6 is formed as a truncated pyramid opening at its peak at an opening 7, and having a circumferential horizontal flange 8 around its lowermost edge. The flange 8 is provided with a molded gully 9 therearound, located so as to be between the inner and outer walls. The outer wall or molding 10 is formed as a pyramid of slightly larger dimensions than the inner wall 6 so that the inner wall can fit within the outer wall, be substantially co-extensive in length and spaced from it by a small amount, for example about 25 mm (1 inch). The outer wall 10 also has a circumferential horizontal flange 11 extending around its lowermost edge, arranged so that the flange 11 locates on the aligns with an outer portion of the flange 8. As may be seen from FIG. 3, the flanges can then be held together by means of plastics of metal clips 12 in the form of rectangular section channels whose sides are resiliently biased towards each other so as to exert a gripping force on the flanges inserted into the channels, thereby securing the two walls 6 and 10 together. FIG. 3 also shows the drain holes 18 which extend through the flange 8 from the base of the gully 9 at intervals therealong so as to allow water gathered in the gully to drain back into the shower cubicle.

Referring to FIG. 4, which illustrates the action of the trap, in use, water vapor that is generated by a hot water shower will rise by convection within the shower cubicle. This vapor will travel to the top of the inner section and pass through the opening 7. Airflow in the condensation trap is maintained by means of the series of holes 5 in the outer section, around and near the base. The vapor will pass into the cavity between the inner and outer walls, where it cools in contact with the surfaces, especially the outer surface which is in turn cooled by contact with the air surrounding the cubicle. The tap is constructed of a material that possesses low thermal insulation properties. This will allow heat loss through the material, increasing efficiently. The material also has to be compatible with the aesthetics of a domestic bathroom, for example.

The condensation which has collected on the surfaces of the condensation trap, now in liquid state, will travel by gravity down the condensation trap to the base area. The condensation is now collected by means of the gully 9, which runs around the base of the condensation trap where the flange 8 of the trap is on the horizontal. The drainage holes 13 allow the collected condensation to drain away back inside the shower cubicle walls.

The condensation trap is placed on top of the shower cubicle 2 so that the clips 12 are in contact with the shower wall top edge.

No extra seals are required as there is no pressure in the system.

Figure 5:
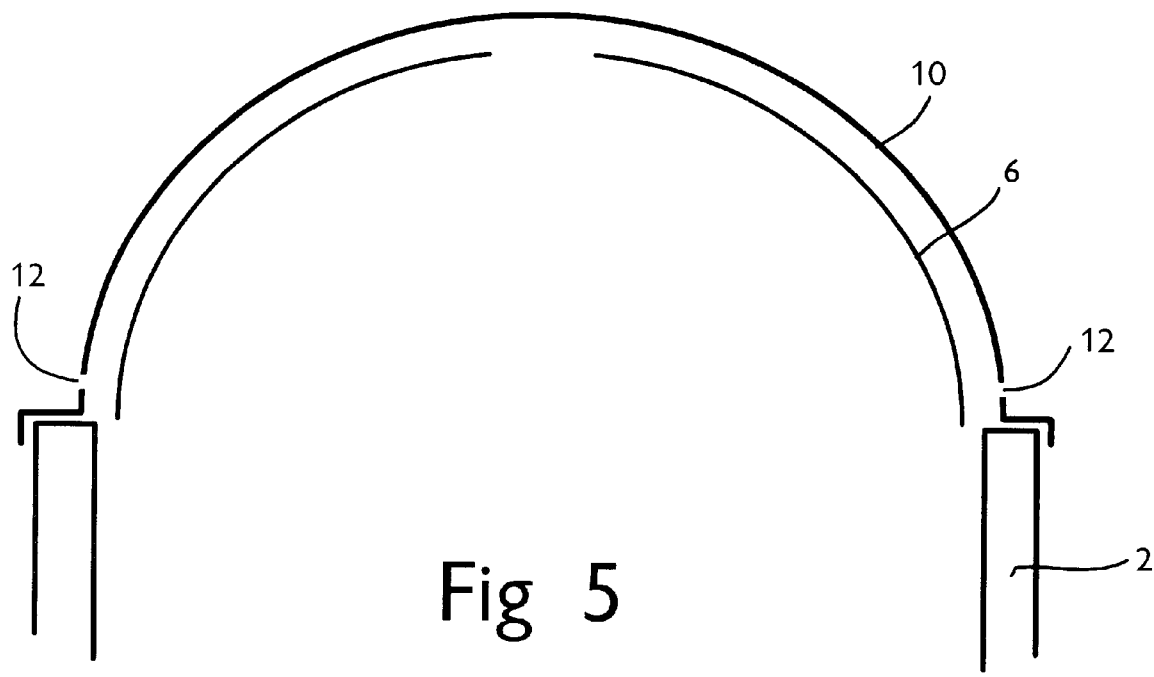
FIGS. 5 and 6 show in cross section alternative shapes of trap in accordance with the invention.
Figure 6:
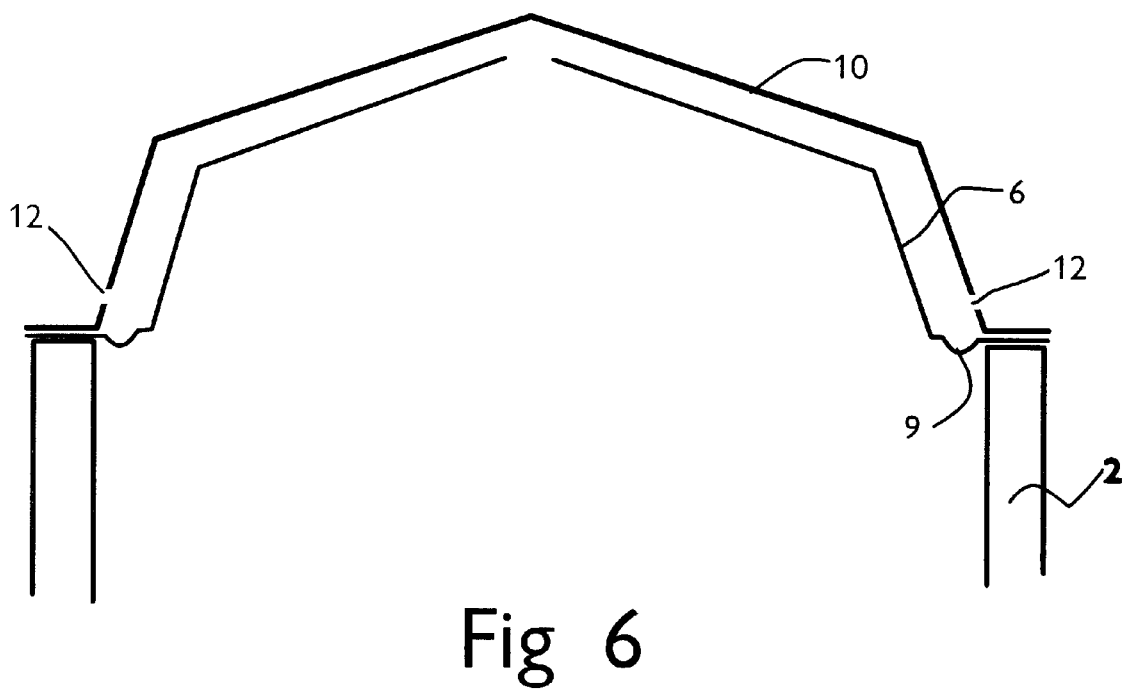

FIGS. 5 and 6 show alternative configurations of the trap of the invention. In the embodiment of FIG. 5, the inner wall 6 is attached to the outer wall 10 in such a way that it terminates without the lower flange 8, and thereby permits condensed water simply to run off the upper surface of the inner wall around its periphery, back into the shower cubicle 2. The embodiment of FIG. 6 is similar to that of FIGS. 1 to 4, but has a stepped pyramid shape to give greater headroom above the user of the shower.

I claim:

1. A shower cubicle condensation trap having a lower edge shaped and dimensioned to permit mounting of the trap on top of a shower cubicle having a main interior drain, sidewalls, and an interior area between the sidewalls, the trap comprising a generally convex cover for the cubicle, the cover having inner and outer walls substantially co-extensive in length spaced apart from each other, the inner wall having an opening in an uppermost part and the outer wall having a plurality of openings adjacent to a lower edge of the trap, the lower edge of the trap being in contact with the cubicle when the trap is mounted thereon, and drainage means for discharging condensed water from between the inner and outer walls into the interior area between the sidewalls of the shower cubicle.

2. A condensation trap according to claim 1, wherein the cover is hemispherical in shape.

3. A condensation trap according to claim 1, wherein the cover is a four-sided pyramid in shape.

4. A condensation trap according to claim 1 comprising a gully therearound in a space between the walls, the drainage means consisting of holes opening from the gully into the shower cubicle.

5. A condensation trap according to claim 1, wherein the drainage means comprise drainage holes through a lower periphery of the inner wall.

6. A condensation trap according to claim 1, wherein the inner wall has a lower thermal conductivity than the outer wall.

7. A condensation trap according to claim 1, wherein the inner and outer walls are separably secured together.

8. A condensation trap according to claim 7, comprising sprung clips for securing edge portions of the inner and outer walls together.

* * * * *